United States Patent [19]

Bourke

[11] 4,258,304
[45] Mar. 24, 1981

[54] BATTERY CHARGER FOR ELECTRICAL VEHICLE

[75] Inventor: Robert F. Bourke, Kamiah, Id.

[73] Assignee: Gould Inc., Rolling Meadows, Ill.

[21] Appl. No.: 943,875

[22] Filed: Sep. 19, 1978

[51] Int. Cl.³ .................... H02J 7/10; B62D 45/00
[52] U.S. Cl. .................................... 320/2; 320/59; 363/64; 318/139
[58] Field of Search ............... 320/2, 20, 21, 39, 40, 320/56, 57, 59; 318/139; 363/64; 336/150; 323/91; 180/65 BA

[56] References Cited

U.S. PATENT DOCUMENTS

| | | | |
|---|---|---|---|
| 3,081,426 | 3/1963 | Bakke | 320/38 X |
| 3,609,502 | 9/1971 | Burkett et al. | 320/5 |
| 3,673,485 | 6/1972 | Vital et al. | 320/2 |
| 3,736,480 | 5/1973 | Lee | 320/59 X |
| 3,904,947 | 9/1975 | Crews | 320/56 X |
| 3,938,020 | 2/1976 | Bourke | 320/59 X |
| 3,958,173 | 5/1976 | Christianson et al. | 363/64 |
| 4,136,382 | 1/1979 | Ricci | 320/57 X |

Primary Examiner—Robert J. Hickey

[57] ABSTRACT

An on-board charger for an electric vehicle propulsion system which provides high charging capacity with minimum weight addition by sharing major elements of the electric vehicle power converter. In the preferred construction, the vehicle power converter has a magnetic element, an interphase transformer, connecting the output of the converter to the motor load. A primary winding is added to the interphase transformer for connection to a commercial AC power source. A phase controlled bridge also connected to the interphase transformer rectifies the AC power for charging the battery.

9 Claims, 5 Drawing Figures

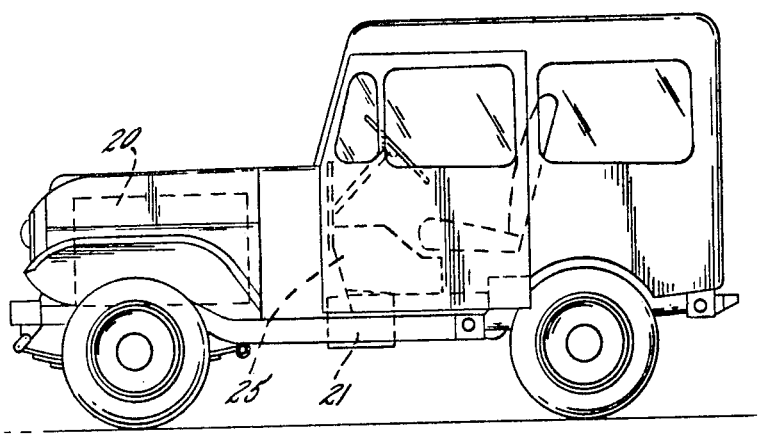

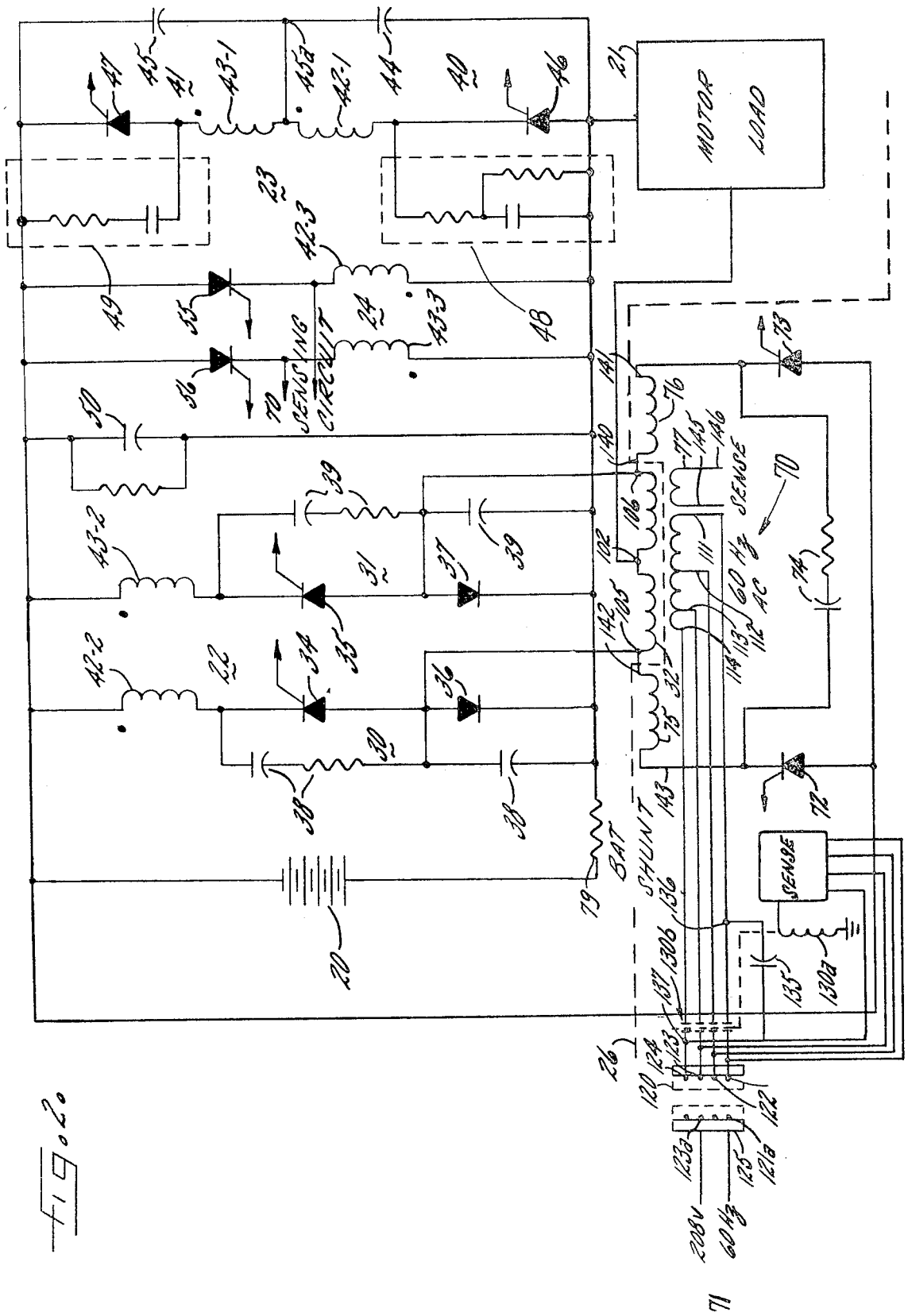

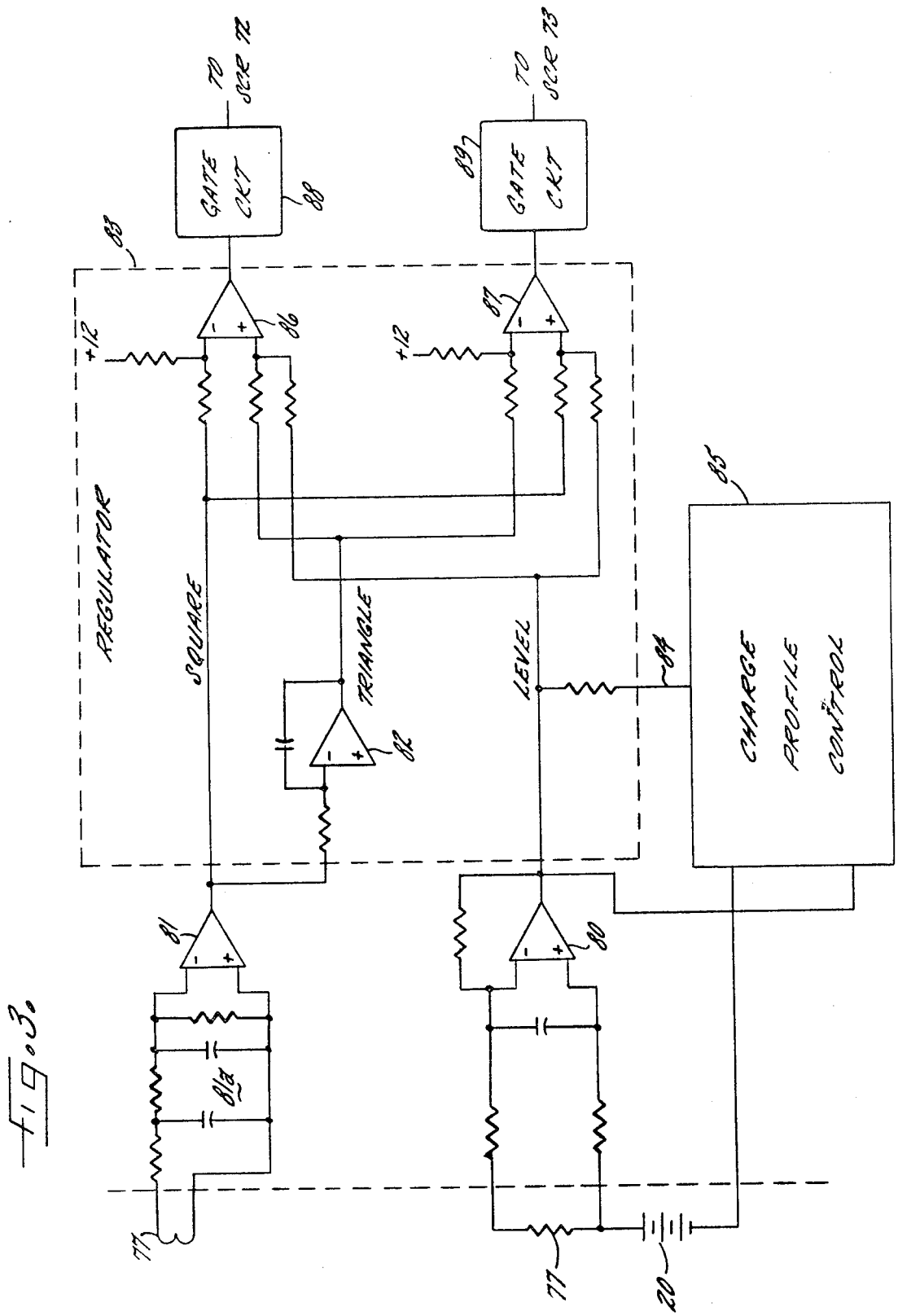

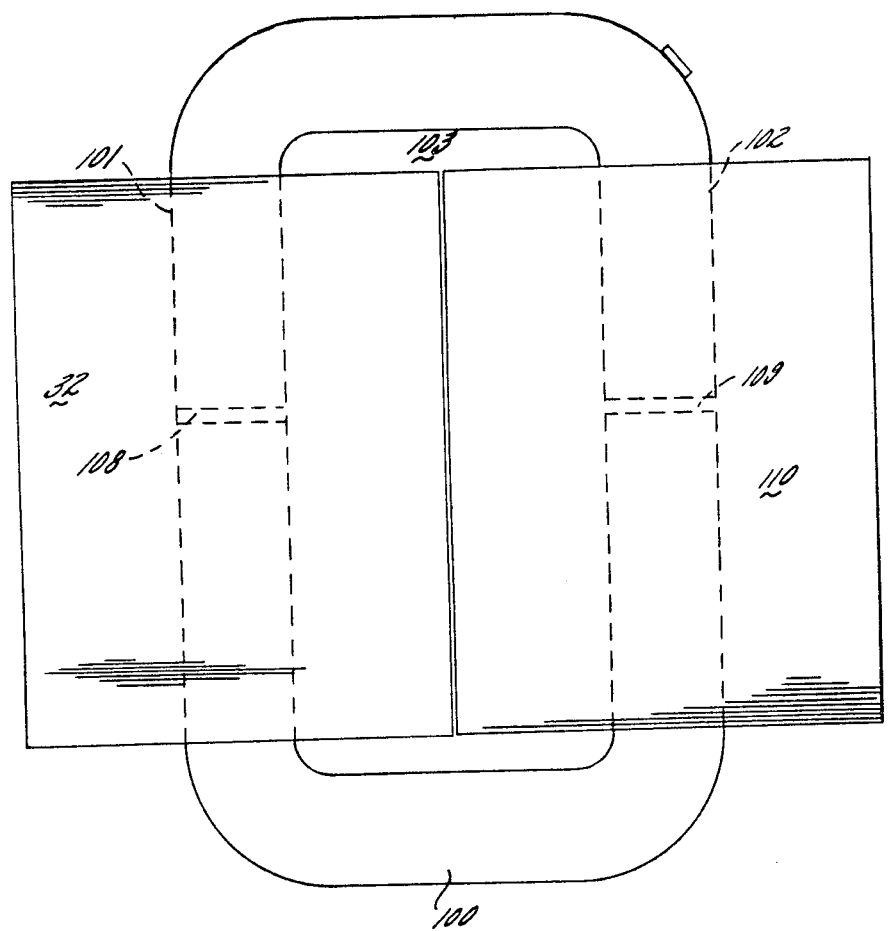

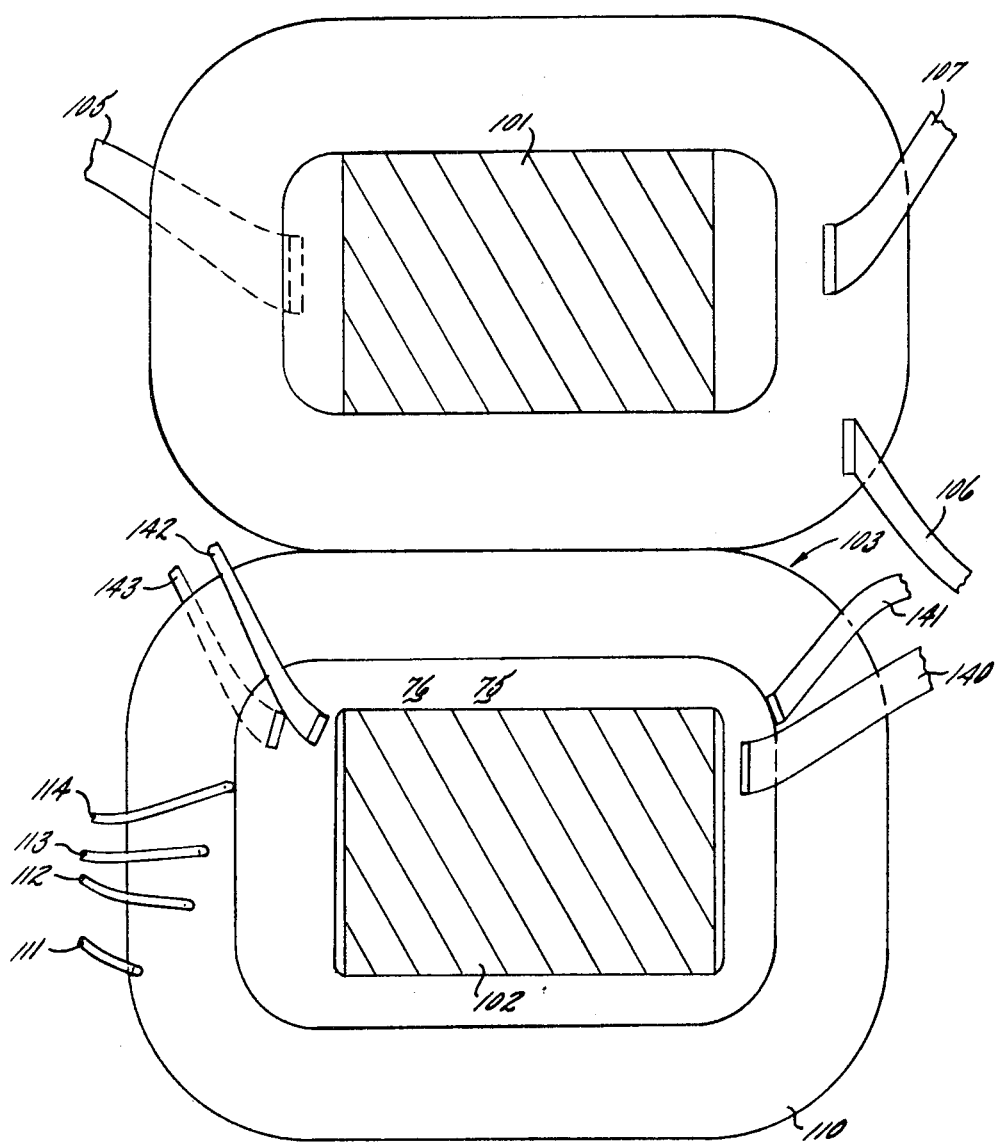

BATTERY CHARGER FOR ELECTRICAL VEHICLE

This invention relates to electric vehicles, and more particularly to chargers for the batteries of such vehicles.

Christianson and Bourke U.S. Pat. No. 3,958,173 describes a power converter capable of use in an electric vehicle. Christianson and Bourke U.S. Pat. No. 4,008,423 describes an electric vehicle using that converter. The system described in those patents charges the propulsion battery from an external source of raw DC power, using the propulsion power converter as a charging regulator. While that approach eliminates the need for a separate regulator, the requirement for an external source of unregulated DC at fairly high current level imposes a rather severe penalty. It is noted in the patents that the "charger" could be mounted on-board or off-board. But, due to the power required to be handled in order to accomplish charging in a reasonable time, even though the charger was a simple transformer-rectifier arrangement, the unit weighed about 200 pounds. If such a unit were mounted on-board, the payload capacity of the vehicle would be substantially reduced. With the unit mounted off-board, flexibility in charging the vehicle is limited because it must return to a station having the appropriate transformer-rectifier arrangement. A further alternative is to charge at reduced power levels; that alternative is not particularly desirable because it substantially lengthens the recharge time.

In the vehicle described in the patents, the propulsion system controller was used to regulate charging current to the battery. Because the controller was a very high current device, and because charging currents must be limited to levels significantly less than motoring currents, the regulator when used for charging was not particularly efficient. Furthermore, the auxiliary commutation inverter used in that system caused the production of substantial audio frequency noise.

With the foregoing in mind, it is an aim of the present invention to provide an electric vehicle having an on-board charger, which avoids the weight penalty associated with a separate input transformer.

More specifically, it is an object of the present invention to provide an electric vehicle having an on-board charger wherein the magnetic elements of the vehicle propulsion system are shared by the charger. Further in that regard, it is an object to provide such a charger wherein the AC power line is electrically isolated from the vehicle.

It is a resulting object to provide an electric vehicle with an on-board charger providing increased flexibility in selecting a recharge station, requiring only the provision of commercial AC power at such recharge station.

Other objects and advantages will become apparent with reference to the following detailed description when taken in conjunction with the drawings in which:

FIG. 1 is an elevation of an on-the-road electric vehicle;

FIG. 2 is a schematic diagram showing the power portion of the propulsion system and charger circuits;

FIG. 3 is a schematic diagram showing the charger control;

FIG. 4 is a front elevation showing the interphase transformer with charging primary; and FIG. 5 is a plan view of the transformer of FIG. 4.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Turning now to the drawings, FIG. 1 shows a service vehicle fitted with an electric propulsion system including a propulsion battery 20, a propulsion motor 21, and a power controller 25. The vehicle shown in FIG. 1 provides an example of the difficulties which can be encountered in attempting to provide an on-board charger capability. The vehicle is intended for use in delivering mail, and is required to have a payload capacity, including driver, of 700 pounds. The vehicle itself weighs about 1850 pounds and the propulsion system another 1850 pounds, the bulk of which is in the battery, in excess of 1400 pounds and the propulsion motor of about 270 pounds. When loaded at rated capacity, the entire package weighs about 4400 pounds. In order to include an adequate charging capability on-board according to the aforementioned patents, it would be necessary to add about 200 pounds to the total weight. While that might not appear to be a significant proportion of the total weight, it must be realized that the vehicle has certain minimum acceleration requirements and minimum range requirements, and that it would be necessary to meet those requirements with the additional 200 pounds. To accomplish that, it might be necessary to add cells to the battery, to increase the size of the motor, etc., all at the cost of even more added weight. In addition to the weight penalty is the difficulty in finding space to locate an adequate on-board charger. The 200 lb. charger discussed above occupied about 3 cubic feet. It will be appreciated from an examination of FIG. 1, that locating such a unit on-board would have a serious adverse effect on cargo capacity. The alternative, of course, is to reduce the size and weight of the DC power supply; but that would limit charging capacity, making the recharge cycle intolerably long. The importance of minimizing weight in general, as well as with respect to the on-board charger in particular will now be apparent.

Turning now to FIG. 2, there are shown the power elements of the electric vehicle, including the power converter and motor shown above the dashed line 26, and the elements added to provide an on-board charger capability shown below the dashed line 26. It is noted that the control elements for the battery charger (as well as for the power converter) are not illustrated; however, the power components form the major portion of the weight. In a practical embodiment of the invention, the components below the dashed line 26 add about 35 pounds to the weight of the vehicle.

For purposes of understanding the present invention, the power converter itself, as well as the control therefore is adequately described in the aforementioned patents. Attention will be directed only briefly to the power converter portion of the vehicle for the purpose of illustrating an environment for the charger and the voltage and current levels encountered. The propulsion battery 20 may be a conventional lead acid storage battery or other high energy density storage battery. In one embodiment of the invention, it was found convenient to use a storage battery of about 65 volts nominal terminal voltage. In the illustrated system, the propulsion motor 21 is preferably a separately excited DC motor having a contactor switching arrangement for powering the motor in an armature control mode for low speed and high torque, and in a field control mode for higher speed.

For controlling current flow to the motor, a dual chopper 22 is provided having a pair of legs 30, 31 driven out of phase with respect to each other and at a variable duty cycle. The outputs of the respective legs are combined in an interphase transformer 32, described in detail in the aforementioned patents. The chopper legs include respective thyristors, shown herein as SCR's 34, 35, triggered by gating circuitry (not shown) to drive the chopper at a variable duty cycle. Freewheeling diodes 36, 37 are connected to the respective SCR's and across the motor load for maintaining current flow in the motor during the off period of the thyristors. Snubbing components 38, 39 are provided for reducing transients.

Associated with the chopper 22 for switching the thyristors in the chopper off, a commutating inverter 23 is provided, having sections 40, 41 associated with the respective chopper legs 30, 31. The commutating inverter 23 is transformer coupled to the chopper, a first transformer having a primary 42-1 magnetically coupled to a secondary 42-2 serially connected in the chopper leg 30. Similarly, the section 41 has a transformer primary 43-1 magnetically coupled to a secondary 43-2 in the chopper leg 31. Energy storage means in the form of capacitors 44, 45 are provided which resonate with the aforementioned primaries under the control of SCR's 46, 47. The SCR's 46, 47 are alternately gated by circuitry not shown, to cause transfer of energy from primary to secondary to commutate the associated chopper leg. As in the case of the chopper, snubbing components 48, 49 are provided for reducing transients. In addition, a network including capacitor 50 is connected across the power supply near the commutating inverter for providing a low impedance AC path for charging the commutating capacitors.

In order to limit the energy in the commutating inverter, a clamp circuit as described in the aforementioned patents can be used to clamp the voltage at a preset level. As a preferable alternative, a programmable commutation circuitry as described in our application Ser. No. 943,872, filed concurrently herewith, and entitled Power Converter With Programmable Commutation is used in order to enhance efficiency. In the former case, conventional clamp windings and diodes are serially connected across the battery. In the latter case, as illustrated in the drawings, special clamp windings 42-3, 43-3 are provided, constructed so that a voltage equal to the battery terminal voltage is induced in the clamp windings rather early in the commutating inverter resonant cycle. The clamp windings are serially connected with respective electronic switches, shown herein as SCR's 55, 56, the series circuits being connected across the battery. Means are provided responsive to the operating level of the chopper 22 for gating the SCR's 55, 56 to clamp the voltage in the commutating inverter at a programmed point dependant on such operating level.

In a practical embodiment of the vehicle illustrated in FIG. 1 using the power circuit shown in FIG. 2, the dual chopper 22 had an RMS current rating of about 500 amps. At stall, the power circuit was able to deliver about 800 amps to the motor, and was capable of developing about 220 lb.ft. torque. The battery itself had a nominal terminal voltage of about 64.5 volts and a capacity, depending on discharge rate, of almost 350 amp hours. The vehicle was capable of speeds up to about 50 miles an hour and had a range adequate for most mail delivery applications.

With capabilities of that kind, the battery recharge problem can become quite acute. Since the vehicle must be available for daily duty, the charge rate must be sufficiently high to enable a full recharge in a reasonable amount of time. For example, if the charger was capable of delivering in the range between about 3.5 and 4 kilowatts during the initial portion of the charging interval, normal charging could be accomplished in about 8 hours. Normally, however, transformers capable of handling 3 ½ to 4 kilowatts are relatively large, making it undesirable to carry them in or on the vehicle.

In accordance with the present invention, the magnetic elements of the power converter described heretofore are shared by an on-board charger so as to provide an on-board charging capability with minimum additional weight and volume. Referring again to FIG. 2, it is seen that the interphase transformer 32 is provided with a further winding in the form of a primary winding 70, and means are provided for connecting the primary winding to a source of commercial AC power indicated generally at 71. Accordingly, when the primary is connected to an AC supply, power is available for charging the battery. In order to regulate charging, controlled rectifier means are provided for controlling current flow in the interphase windings, now operating as the secondary of an isolation transformer. In the exemplary embodiment, a pair of gate controlled thyristors shown as SCR's 72,73 are provided, having their anodes connected to the negative terminal of the battery and their cathodes coupled to the interphase transformer 32. Snubbing components 74 are connected between the cathodes for reducing transients. The basic electrical and magnetic parameters of the interphase transformer 32 are established for the voltages and frequencies encountered in the motoring mode where the chopper 22 is delivering power through the interphase transformer to the motor load. For matching the magnetic characteristics of that basic structure to the requirements of the charging circuit, wing windings 75,76 are provided, interposed between the cathodes of the respective SCR's and the terminals of the interphase transformer. The wing windings have sufficient turns to match the magnetic characteristics of the interphase transformer with the voltages and frequencies applied during charging.

In the illustrated embodiment, the free-wheeling diodes 36,37 provide a convenient means for connecting the charging circuit to the positive terminal of the battery to complete the path for charging current flow. The diodes 36,37 have their cathodes connected to the positive terminal of the battery and their anodes connected to respective ends of the interphase transformer so that in the motoring mode, they circulate motor current during the off period of the chopper SCR's. Arranged in that fashion, the diodes provide a convenient path to the positive terminal of the battery for charging, forming two branches of a phase controlled bridge, the remaining two branches of which are formed by the SCR's 72,73. Accordingly, no configuration switching is required in the DC circuit of the chopper in order to connect the charger to the battery during charging or remove the charger from the battery during motoring. To initiate charging, it is simply necessary to apply AC power to the primary and to activate the charging regulator. The SCR's 72,73 are then gated by the charging regulator (to be described in connection with FIG. 3) to phase control the bridge and apply regulated power to the battery. During one half of the cycle, conduction is through SCR 73 and free-wheeling diode 36, whereas during the opposite half, conduction is through SCR 72 and free-wheeling diode 37. The interphase transformer is also provided with a ryder winding 77 forming an input to the gating circuit for the phase controlled rectifier 72,73, so as to synchronize triggering with the phase of the AC signal. A battery shunt 79 is connected between the positive terminal of the battery and the charger so as to provide a signal indicative of the magnitude of charging current.

Turning now to FIG. 3, there is shown, partly in block diagram form, partly in schematic form a regulator usable with the phase controlled bridge of FIG. 2. Those skilled in this art will appreciate that many forms of regulator circuitry can be used to control the bridge shown in FIG. 2, and that the illustrated regulator is merely exemplary. FIG. 3, shows the propulsion battery 20 with serially connected shunt 79 the shunt being connected to a scaling amplifier 80 so as to produce a signal having a level related to battery charging current. The ryder winding 77 forms a sensing input for timing the phase control signals for the bridge with the phase of the AC signal. The winding 77 is connected via an integrator 81a for suppressing noise on the sense signal to a high gain amplifier 81 which produces a sqaure wave at the output thereof having a frequency corresponding with that of the input AC signal. An integrating amplifier 82 is connected to respond to the square wave, to produce a triangular wave output, inverted with respect to the square wave. The regulator 83 responds to the square wave, triangular wave and level, as well as to a demand signal on input line 84 for phase controlling the charging bridge. The demand signal can be produced in any desirable manner according to the characteristics of the battery being charged. Various means for producing such signal are well known, and depend on the characteristics of the battery; accordingly they are not illustrated herein, the function being denoted simply as charge profile control 85.

The regulator includes a pair of summing amplifiers 86,87 responsive to the aforementioned signals for controlling a pair of gate circuits 88,89. The gate circuit 88 is connected to trigger the SCR 72 whereas the gate circuit 89 is connected to trigger the SCR 73.

The regulator operates to control the conduction angle of the bridge in the following manner. Referring first to the amplifier 86, it is seen that the square wave is connected to the inverting input thereof and translated positively by a fixed reference voltage. The triangular wave is connected to the non-inverting input thereof and is translated positively by an amount dependant on the sum of the analog levels produced by amplifier 80 and the charge profile control 85. As a result, during the positive portion of the square wave, the amplifier 86 will maintain its output low irrespective of the triangular and level signals. During the negative portion of the square wave, the amplifier 86 compares the low level thereof with the triangular wave translated as described, so as to cause the output of amplifier 86 to switch high at a point determined by the level and demand signals. When the level is quite positive, the rising triangular wave translated by such positive level will cause the amplifier output to switch high rather early in the cycle. Contrarywise, when the level is quite low, the triangular wave will advance to near its peak before the amplifier 86 will switch the output thereof high. The gate circuit 88 is triggered whenever the output of amplifier 86 switches high so as to cause conduction of the associated SCR in dependance on the sense and demand signals.

The amplifier 87 responds in a similar manner. It is seen that the square wave is connected to the non-inverting input thereof and is translated positively by an amount dependent on the level and demand signals. The triangular signal is connected to the inverting input thereof and is translated positively by a fixed amount determined by the illustrated reference voltage. Accordingly, the output of amplifier 87 will remain low during the negative portion of the square wave, that is, during the time the amplifier 86 is responding. But during the positive portion of the square wave, the amplifier 87 will compare the translated triangular wave with the square wave translated in dependence on the demand and sense signals to energize the gate circuit 89 and trigger the SCR 73 at the appropriate point in the cycle.

Turning now to FIGS. 4 and 5, there is shown the structure of the interphase transformer which achieves the desired on-board charger capability with minimum weight penalty. It is seen that the transformer comprises a magnetic core 100 having a pair of legs 101,102 enclosing a central window 103. The interphase winding 32 is wound on the leg 101; as shown in FIG. 5, the interphase winding 32 is preferably of strap copper, having leads 105,106 formed at the ends thereof and a center tap 107. The corresponding terminals are indicated in the schematic diagram of FIG. 2. To achieve proper operation of the interphase transformer in motoring, it is necessary to prevent saturation which might be caused by slight unbalances between the legs of the chopper. That is accomplished in the illustrated embodiment by a pair of gaps 108,109 which provide magnetizing inductance for the connector. It is seen that the core is actually formed of two sections separated by the gaps 108,109.

In practicing the invention, the interphase transformer is provided with a primary winding 70, serving as a source of charging power for the propulsion battery. The primary is wound on the leg 102 to provide adequate primary to secondary leakage inductance for proper operation of the charger. Preferably, the primary is tapped to allow charger operation at a number of different commercial input voltages, for example, having a common terminal 111 and taps 112, 113 and 114 for 120, 208 and 240 volts, respectively; the corresponding terminals are also shown in FIG. 2. FIG. 2 also illustrates a desirable feature in providing universality of charging, namely a connector 120 having respective pins 121-124 connected to the various taps so that the appropriate charging voltage is automatically selected by the manner in which the charging station cable is wired. For example, if a particular charging station has a 208 volt 60 Hz. supply, the mating connector 125 on the charging station cable is wired to connect such supply to the pins 121A, 123A. Accordingly, the vehicle can be connected to the supply without the need to check the available voltage level, the mated connectors automatically matching the supply to the appropriate tap.

FIG. 2 also illustrates a contactor 130 for connecting the AC source to the primary when the connectors 120, 125 are properly mated. A sensing circuit 131, which may be a simple LED and resistor circuit activated when AC power is supplied to the connector 120, energizes the coil 130a associated with contacts 130b. Accordingly, simply mating the connectors serves to energize the relay and close the contacts, thereby applying primary power to the charger.

It was previously noted that the interphase transformer required gaps 108, 109 for operation in the motoring mode. However, the effect of the gaps is undesirable when operating in the charging mode because of the adverse effect on power factor. To correct for the inductance introduced by the gaps, a single power factor correcting capacitor 135 is provided having a first terminal 136 connected on the charger side of the contacts 130b and a second terminal 137 connected on the line side thereof. As a result, in the motoring mode, the power factor correcting capacitor is out of the circuit. However, in charging, the power factor correcting capacitor 135 is imposed across the terminals 111 and 114 of the primary 70 to improve the power factor. Even in the case where AC power is supplied to one of the center taps, the primary acts as an autotransformer to provide the appropriate amount of power factor correction.

In order to improve charging efficiency, means are provided for matching the magnetic characteristics of the transformer with the electrical characteristics of the charging circuit. To that end, the wing winding 75,76 are wound on the leg 102 and beneath the primary winding 110. The wing winding 75 has inner and outer terminals 140,141 and the wing winding 76 similar inner and outer terminals 142,143. Such terminals are also indicated in the schematic of FIG. 2. The ryder winding is schematically illustrated in FIG. 4. Such winding includes only a relatively few turns, positioned as close as possible to the primary 110. In the illustrated embodiment, the ryder is wound outside the primary, and has terminals 145,146 for connection to the regulator circuit.

The transformer described functionally in connection with FIG. 1-3 and shown in detail in FIGS. 4 and 5 is capable of handling about 3.5 kilowatts during charging. This reasonably substantial charging capacity allows the propulsion battery to be recharged in about 8 hours. But, since the interphase transformer was an element of the propulsion system in the first instance, and since the provision of the primary and the slightly enlarged size of the transformer adds only about 35 pounds to the weight of the vehicle and very little to the volume of the controller, the advantages attributable thereto will now be appreciated. And an advantage not be ignored is the fact the AC supply is isolated from the vehicle, which provides personnel safety without the need for covers, shrouds, interlocks and the like.

I claim as my invention:

1. In an electric vehicle having a propulsion battery, a propulsion motor, a power converter for controlling power from the battery to the motor, the converter having a magnetic element with a first winding interposed between the output of the converter and the motor for delivering power from the battery through the converter to the motor, the improvement comprising, a primary winding on said magnetic element, means coupling AC power to the primary winding for charging the battery, controlled rectifier means connected between the first winding of the magnetic element and the battery, and gate means for triggering the controlled rectifier means for rectifying the AC power and supplying said rectified power through said first winding to the battery for charging same.

2. In an electric vehicle having a propulsion battery, a propulsion motor, a power converter for controlling power from the battery to the motor, the converter comprising a chopper with at least two legs and an interphase transformer having windings for combining the outputs of said legs and applying the combined outputs to the motor, the improvement comprising a primary winding magnetically coupled to the windings of said interphase transformer, a switching regulator connected between said windings of the interphase transformer and the battery, means coupling AC power to said primary winding, and means switching the switching regulator in controlled fashion to rectify the AC power and supply said rectified power through said windings of the interphase transformer to the battery for charging same.

3. The improvement as set forth in claim 2 wherein the interphase transformer includes wing windings connecting same to the switching regulator, the wing windings having a sufficient number of turns to match the magnetic characteristics of the interphase transformer to the current flowing through the switching regulator.

4. The improvement as set forth in claim 2 wherein the power converter includes free-wheeling diodes connected to one terminal of the battery, said switching regulator comprising a pair of gate controlled switches connected to the other terminal of the battery, means coupling the non-battery connected terminals of the gate controlled switches to the non-battery connected terminals of the free-wheeling diodes, thereby to use the free-wheeling diodes of the power converter in a bridge circuit for the charging regulator.

5. The improvement as set forth in claim 2 wherein the interphase transformer includes a gapped core for providing magnetizing inductance to the power converter, said charging regulator including a power factor correcting capacitor connected across said primary for compensating for said magnetizing inductance when using said interphase transformer in charging.

6. The improvement as set forth in claim 5 wherein there is provided connecting means for connection of the AC source, contactor means interposed between the connecting means and the primary, means for closing the contactor means during charging, the power factor correcting capacitor having on terminal connected on the AC source side of the contactor and another terminal connected on the primary side of the contactor, whereby the power factor correcting capacitor is in circuit only during charging.

7. The improvement as set forth in claim 6 wherein the primary includes a plurality of voltage taps, the connecting means includes a plurality of contacts connected to respective ones of said taps, so that a mating connecting means at a charging station automatically supplies the correct tap.

8. The improvement as set forth in claim 3 wherein the interphase transformer includes a core having a pair of legs enclosing a central window, the interphase windings being wound on one of said legs, the primary and wing windings being wound on the other of said legs for providing sufficient leakage inductance between the primary and the interphase windings.

9. The improvement as set forth in claim 8 wherein the interphase transformer further includes a ryder winding closely coupled to said primary winding for providing a signal in phase with the AC line for synchronizing the charging regulator.

* * * * *